United States Patent [19]

Breeden et al.

[11] Patent Number: 5,327,578
[45] Date of Patent: * Jul. 5, 1994

[54] RADIO TELEPHONE SYSTEM SUPPORTING AUTOMATIC BUSY AND OUT-OF-RANGE INDICATIONS

[75] Inventors: Robert L. Breeden; Gary S. Lobel, both of Boynton Beach; Thomas V. D'Amico, Boca Raton, all of Fla.

[73] Assignee: Motorola, Inc., Schaumburg, Ill.

[*] Notice: The portion of the term of this patent subsequent to Apr. 13, 2010 has been disclaimed.

[21] Appl. No.: 935,492

[22] Filed: Aug. 25, 1992

Related U.S. Application Data

[63] Continuation of Ser. No. 579,646, Sep. 10, 1990, Pat. No. 5,203,013.

[51] Int. Cl.[5] .................................. H04B 17/00
[52] U.S. Cl. .................................. 455/34.2; 370/29; 455/54.1; 455/67.7; 455/154.2
[58] Field of Search ................. 455/32.1, 33.1, 34.1, 455/34.2, 53.1, 54.1, 54.2, 56.1, 67.1, 67.7, 62, 226.1, 154.1, 154.2, 156.1, 161.1, 161.3, 229; 370/24, 29, 95.1, 95.3; 379/58-61, 63

[56] References Cited

U.S. PATENT DOCUMENTS

| | | | |
|---|---|---|---|
| 4,851,820 | 7/1982 | Fernandez | 455/67 |
| 4,873,711 | 10/1989 | Roberts et al. | 379/58 |
| 4,882,766 | 11/1989 | Akaiwa | 455/58 |
| 4,953,198 | 8/1990 | Daly et al. | 379/61 |
| 5,049,875 | 9/1991 | DeLuca et al. | 455/229 X |
| 5,203,013 | 4/1993 | Breeden et al. | 455/34.2 |

OTHER PUBLICATIONS

MPT 1375 Common Air Interface Specification, May 1989.

Primary Examiner—Reinhard J. Eisenzopf
Assistant Examiner—Chi Pham
Attorney, Agent, or Firm—Gregg Rasor

[57] ABSTRACT

A radio telephone communication system (200) having a base station (203) including at least one frequency agile time division duplex transceiver (207) for facilitating communication with at lest one radio telephone (100) on the at least one radio frequency channel. The radio telephone (100) scans a plurality of channels capable of being generated by the at least one frequency agile transceiver (207) to find an available channel and provide an indication representing a base station busy status when all the at least one frequency agile transceivers are in use. A base station busy status is indicated when one of a bidirectional time division duplex communication including a base station identification signal is being communicated by the at least one frequency agile transceiver or a unidirectional time division duplex communication including a base station identification signal is being communicated by the at least one frequency agile transceiver (207).

17 Claims, 6 Drawing Sheets

RADIO TELEPHONE SYSTEM SUPPORTING AUTOMATIC BUSY AND OUT-OF-RANGE INDICATIONS

This is a continuation of application Ser. No. 579,646, filed Sep. 10, 1990, now Pat. No. 5,203,013.

FIELD OF THE INVENTION

This invention relates in general to radio telephone communication systems, and more particularly to those systems that support busy (in use) and/or out-of-range conditions and is particularly directed toward a Time Division Duplex (TDD) radio telephone system supporting busy and out-of-range functions.

BACKGROUND OF THE INVENTION

In contemporary telephone systems, the telephone user addresses other radio telephone units or land-line telephones by entering a telephone number that corresponds to the phone system address of the user to be contacted. Once the connection is complete, two way voice or data communications can take place.

With the growing use of portable radio telephone (cellular or CT-2) systems as a mode of communication, there are two normally occurring conditions that can prevent the establishment of a radio frequency link with a base station (e.g. Telepoint): all channels of the base station may be BUSY handling other calls, or the portable radio telephone attempting to access the system may be out-of-range.

It is desirable to be able to indicate to the user which of the two conditions is responsible, because in the BUSY case the user merely needs to wait for a channel to become available, while in the out-of-range case, the user needs to move closer to the Telepoint. It is easy enough to provide status indicators on the radio telephone to visually indicate either the BUSY or the out-of-range condition, but the Common Air Interface (CAI) specification, on which the CT-2 system is based, makes it difficult to determine which of the two conditions has prevented the establishment of a link.

The difficulty in implementing functional BUSY and out-of-range indicators arises because the CT-2 system uses a Time Division Duplex (TDD) transmission scheme on a single RF channel. TDD optimizes the use of the available radio frequency spectrum by allowing transmission of voice and data in both directions between the Telepoint and the portable radio telephone. Specifically, the radio telephone and the Telepoint alternately transmit and receive one-millisecond bursts of information every two milliseconds, one receiving while the other transmits. The CAI specification, however, provides no reliable way for an unsynchronized receiver monitoring an active channel on which a call is in progress to tell whether it is monitoring a transmission from a radio telephone or from a Telepoint at any given moment in time.

Under most circumstances, to originate a call, the user must travel within range of a Telepoint and activate a transmitter in the user's radio telephone, thus placing the call. However, this simple scenario does not address the case where the user cannot determine whether the user is in range of the Telepoint, or if the Telepoint has any channels available for communication.

SUMMARY OF THE INVENTION

Briefly, according to the invention, there is provided a radio telephone communication system having a base station and at least one radio telephone capable of communicating with each other over at least one radio frequency channel.

The base station includes at least one frequency agile time division duplex transceiver for facilitating communication with at least one radio telephone on the at least one radio frequency channel. The radio telephone scans a plurality of channels capable of being generated by the at least one frequency agile transceiver to find an available channel and provides an indication representing a base station busy status when all of the at least one frequency agile transceivers are in use. The base station busy indication is determined when one of a bidirectional time division duplex communication including a base station identification signal is being communicated by the at least one frequency agile transceiver on the at least one radio frequency channel or a unidirectional time division duplex communication including a base station identification signal is being communicated by the at least one frequency agile transceiver on the at lest one radio frequency channel.

DESCRIPTION OF A PREFERRED EMBODIMENT

Figure 1:
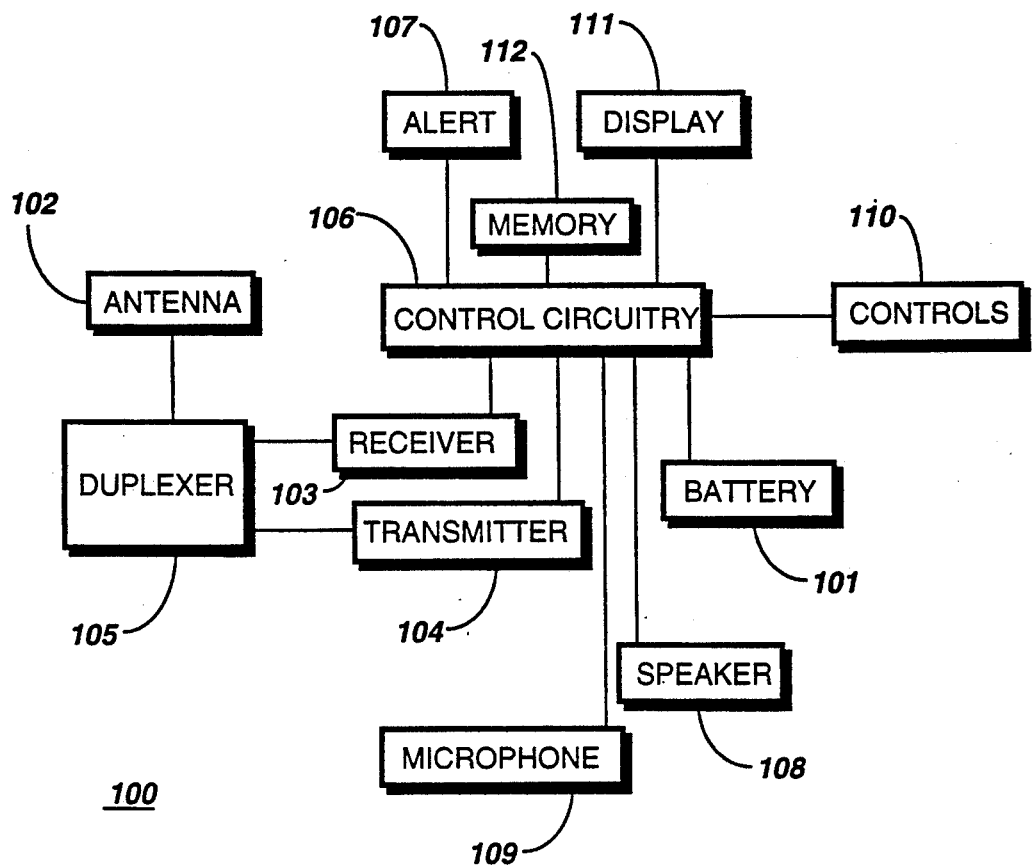
FIG. 1 is a block diagram of a radio telephone suitable for use with the present invention.

Referring to FIG. 1, a block diagram is shown of a battery (energy source) 101 powered radio telephone 100. Operationally, a radio frequency signal is received or transmitted by the antenna 102. The antenna is coupled to the receiver 103 and transmitter 104 by a diplexer 105. The received signal is routed from the receiver 103 to the control circuitry 106 that recovers any information represented by the received signal. The recovered information is then used to activate functions within the radio telephone 100 such as the alert 107 (a ringer in the case of a radio telephone), and after answering the call, sustain the connection. When a connection is established, the user aurally communicates with the other party via the speaker 108 and a microphone 109. Recovered audio from the control circuitry 106 is routed to the speaker 108 which converts electrical energy into acoustical energy thus enabling the user to hear any communications. The microphone 109 is used to convert acoustic energy into electrical energy for use by the control circuitry 106 in modulating the radio frequency carrier produced by the transmitter 104. The user may initiate a call by selecting on a keypad 205 the proper controls 110 representing the number of a party to be contacted.

Before dialing, the desired number is preferably presented on a display 111 which provides visual feedback for the user. If desired, the user may either place the call, edit the number, or abort the dialing operation. When a call is initiated, the transmitting means 106, 104, 105, 102, broadcasts a modulated radio frequency carrier having information representative of the PSTN access codes, both alternate (limited or controlled access) and standard (local). The radio telephone base (Telepoint) or an alternate unit operates to establish a communication link once proper identification is confirmed.

Figure 2:
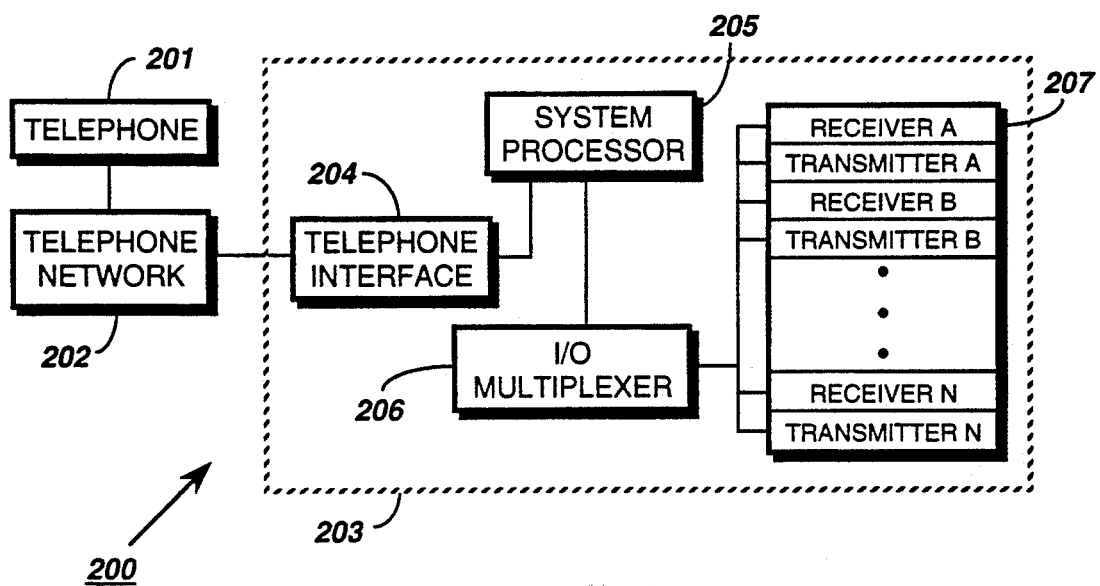
FIG. 2 is a block diagram of a base station suitable for use with a Time Division Duplex (TDD) communication system as discussed in the present invention.

Referring to FIG. 2, a block diagram is shown of a base station system (200). The base station's purpose is to establish and maintain (for the duration of a call) a communication link between a telephone (201) and a radio telephone as shown in FIG. 1. The telephone (201) communicates with the base station (203) via a telephone network (202). The base station is capable of receiving a plurality of telephone links (or lines) using its telephone interface (204) that acts to route the incoming and outgoing traffic to a transmitter/receiver pair as selected by the system processor (205). The system processor (205) controls the telephone interface (204) and allocates via an I/O multiplexer (206) one transmitter/receiver pair per incoming or outgoing telephone line. The transmitter/receiver pairs are part of a bank of frequency agile modular transceivers (207) that can be easily expanded to meet the traffic demands for a particular system. In implementing a system that meets the CT-2 (cordless telephone - two) CAI specification, each transmitter/receiver pair must be capable of time division duplex operation (TDD) over the same radio frequency channel. TDD operation for this application is defined by the alternate transmission and reception, by both the radio telephone and the selected transmitter/receiver pair at the base station, of radio frequency information packets (e.g., digital or analog modulation carrying voice or data information). That is, when one unit transmits, the other unit listens. This information transfer method (TDD) yields the equivalent to a full duplex communication link, on a single radio frequency channel.

Figure 3:
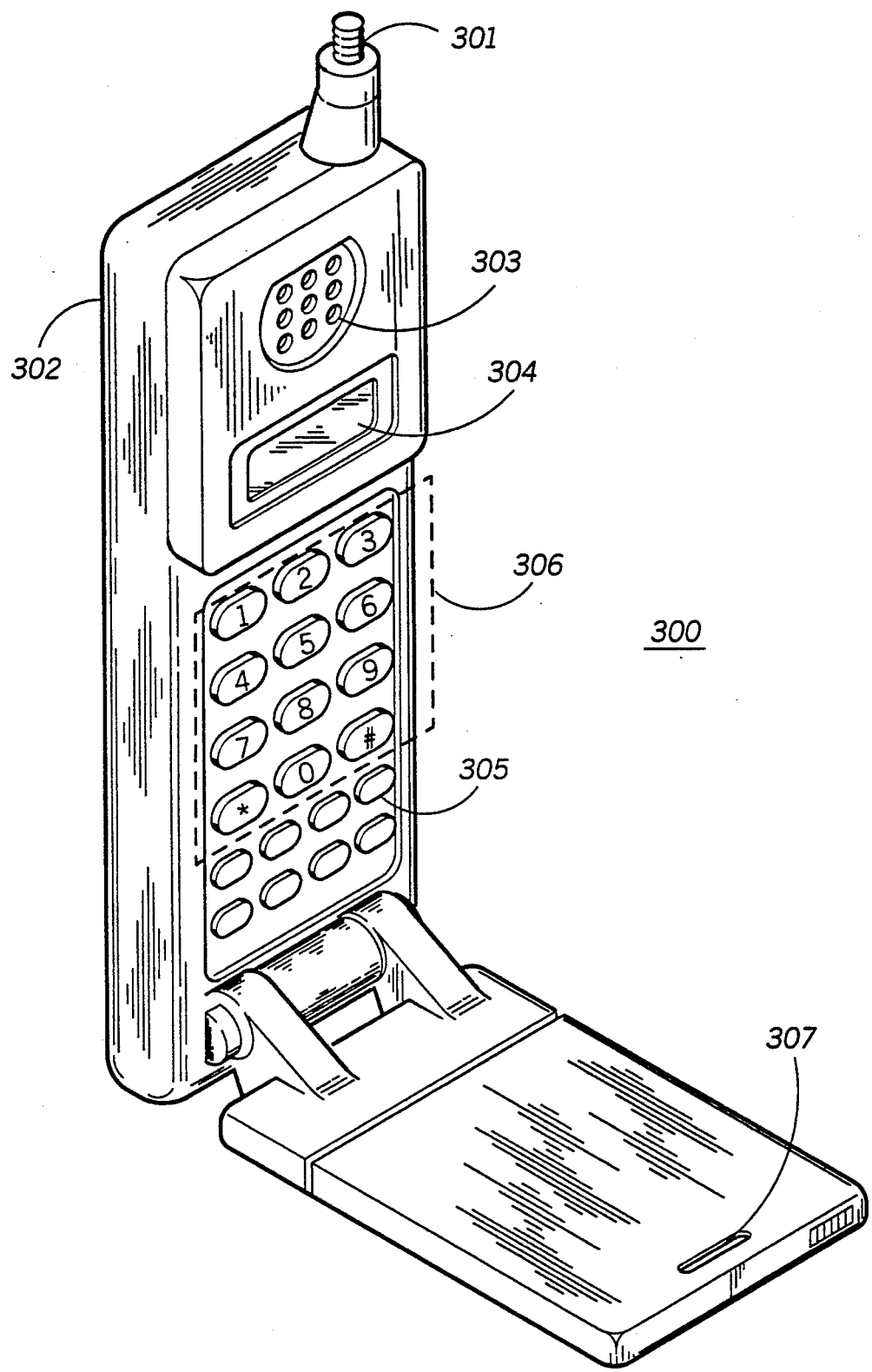
FIG. 3 is an front isometric view of the radio telephone of FIG. 1.

Referring to FIG. 3, the front isometric view of the radio telephone 300 shows the antenna 301, radio telephone housing 302, loudspeaker 303, display 304, control pad including a dialing keypad 306 and associated operational controls 305 such as a clear key, function key, recall key, and function key, and a microphone 307. Electrical contacts (not shown) located on the back of the radio telephone 300 are provided for charging the removable power source in the radio telephone. For example, charging is accomplished by folding the lower articulated portion upward against the control pad 305 then inserting the folded unit into a charging apparatus (not shown). Alternatively, a portable power adapter can be coupled into a power jack located on the radio telephone 300 for charging the power source or supplying external power.

When the user invokes the call mode on the radio telephone 300, the controller circuitry 106 scans the controls 110. Preferably, the user may abort the call mode at any time by entering an "escape" keystroke or waiting for the entry mode to "time out." When the user enters initial digits, the controller processes this first information for acceptance as valid digits and displays the digits. When a valid access code or number has been entered, it is presented, thus providing feedback and allowing the user to accept or reject the code entered. If the digits entered are incorrect the user may press the CLR (clear) function key clearing the present entry and returning to enter new digits. If the digits displayed are correct, the user may choose to dial the number by depressing the SND (send) function key which initiates transmission of the call information. The user may optionally replace the displayed number with a stored number by activating the RCL (recall) function key, entering the stored number's code or memory number, determining if the code is correct and valid, and displaying the newly recalled stored number. The number to be dialed is then presented on a display to the user for verification. The user can then accept or reject the transmission of the number. When the user is ready to transmit the number (initiate a call), the SND (send) function is selected and transmission of the calling information takes place. If the user rejects transmission or, after dialing has been completed, the call initiation sequence returns control to normal standby radio telephone functions.

Figure 4:
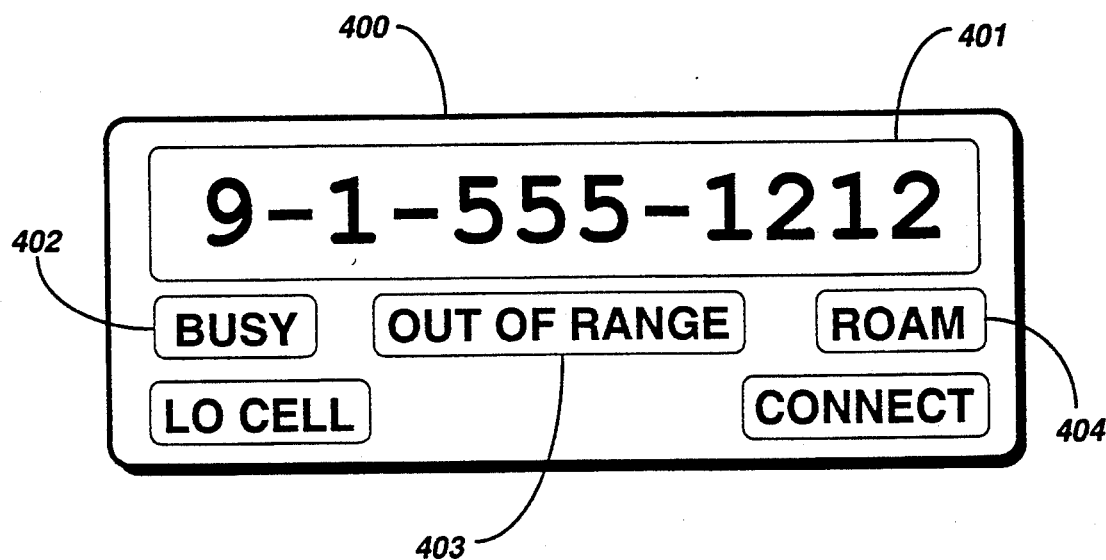
FIG. 4 is an illustration of the information display in FIG. 3 showing BUSY and out-of range indicators in accordance with the present invention.

Referring to FIG. 4, an information display (400) is shown that comprises a character display means (401), a BUSY (402), an OUT-OF-RANGE (403) indicator, and a ROAM (404) indicator. The character display means (401) is capable of presenting either numeric or alphanumeric information representing a phone number or an alias (i.e., a name or phrase) to a phone number.

Figure 5A:
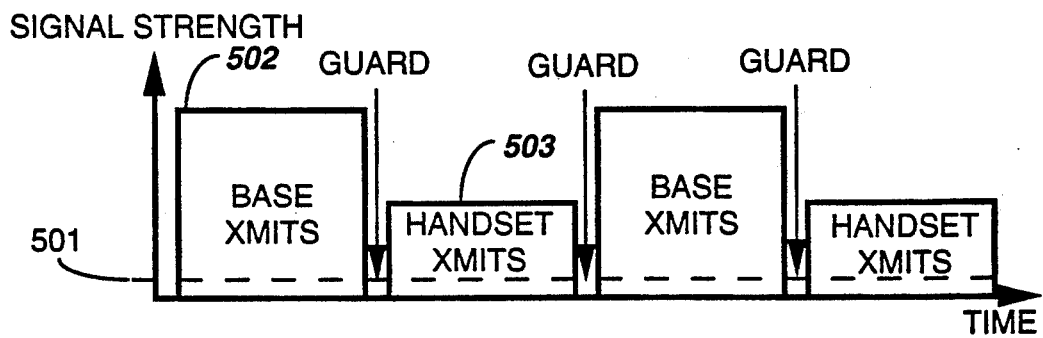
FIG. 5A illustrates TDD transmissions where the received signal strength is above the minimum threshold for both the radio telephone and the Telepoint.

Referring to FIG. 5A, if a radio telephone is able to find a channel on which adequate signal strength (greater than a predetermined amplitude, 501) is present in both directions (i.e., continuous bidirectional transmissions with no 1 mS gaps), then it is reasonable to assume that the radio telephone is monitoring transmission from both another radio telephone (502) and a base station (503).

Figure 5B:
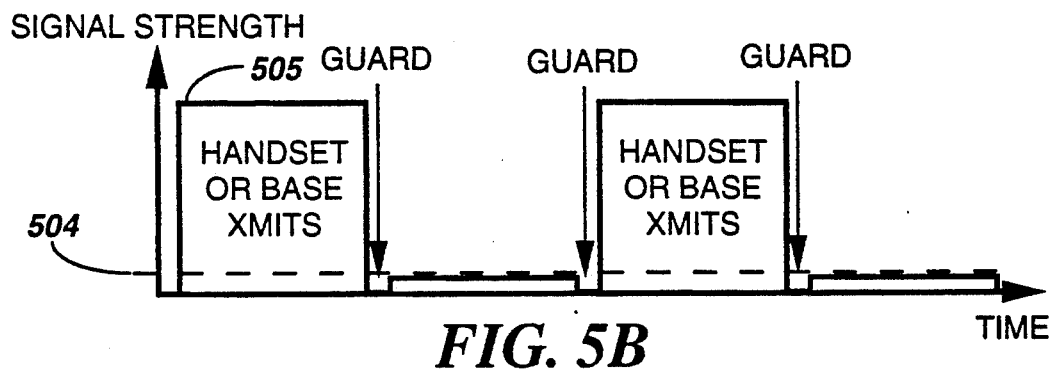
FIG. 5B illustrates TDD transmissions where the received signal strength is above the minimum threshold one of either the radio telephone or the Telepoint.

Referring to FIG. 5B, when a radio telephone has scanned all possible CT-2 channels and found no channel upon which adequate signal strength (504) is present in both directions, but has found one or more channels on which there is adequate signal strength in one direction (505) (i.e., 1 mS signals with 1 mS gaps), an uncertainty exists.

Figure 5C:
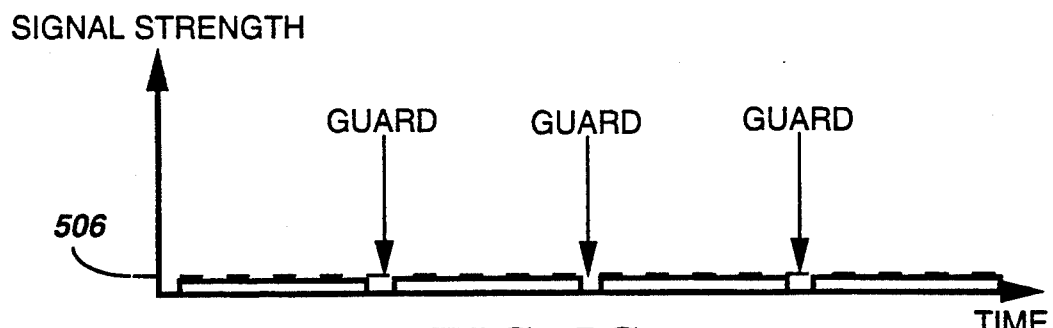
FIG. 5C illustrates TDD transmissions where the received signal strength is below the minimum threshold for both the radio telephone and the Telepoint.

Referring to FIG. 5C, when a radio telephone has scanned all possible CT-2 channels found no channel on which adequate signal strength (506) is present in either direction, it is apparent that the radio telephone is out-of-range.

Figure 5D:
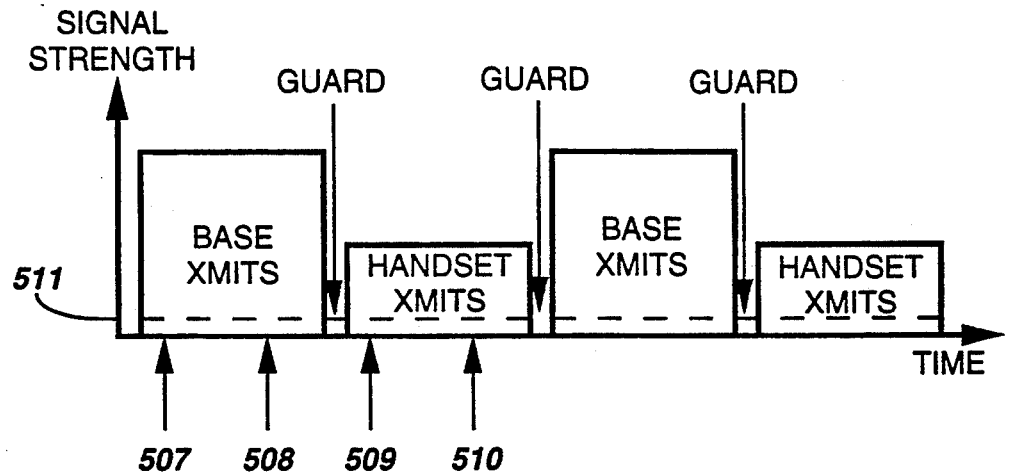
FIG. 5D illustrates TDD transmissions and receiver sample points where the received signal strength is above the minimum threshold for both the radio telephone and the Telepoint.
Figure 5E:
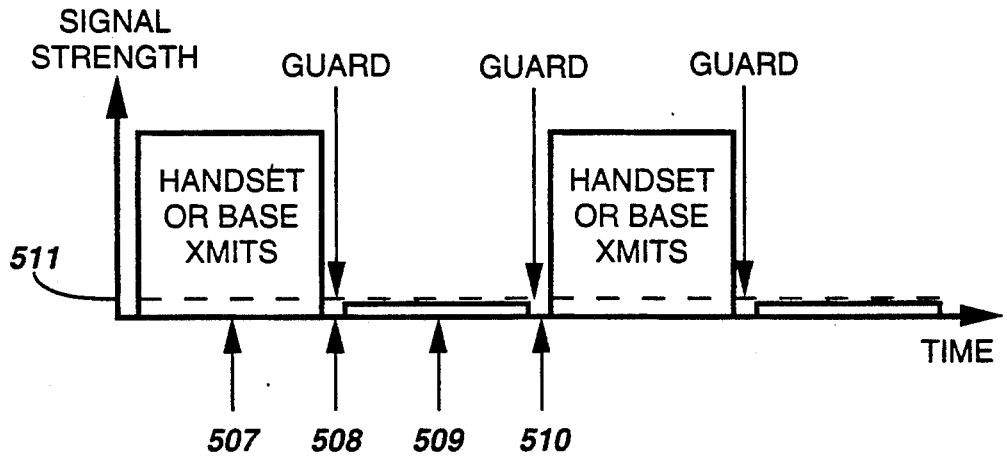
FIG. 5E illustrates TDD transmissions and receiver sample points where the received signal strength is above the minimum threshold one of either the radio telephone or the Telepoint.
Figure 5F:
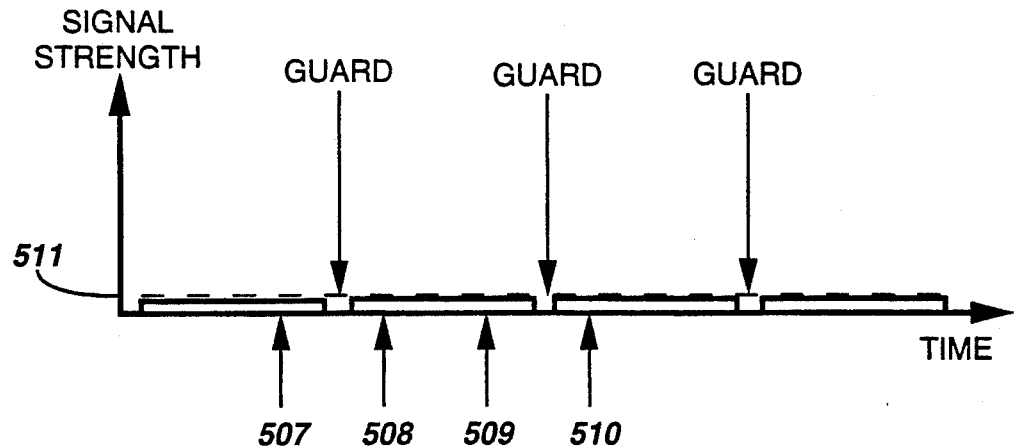
FIG. 5F illustrates TDD transmissions and receiver sample points where the received signal strength is below the minimum threshold for both the radio telephone and the Telepoint.
Figure 6:
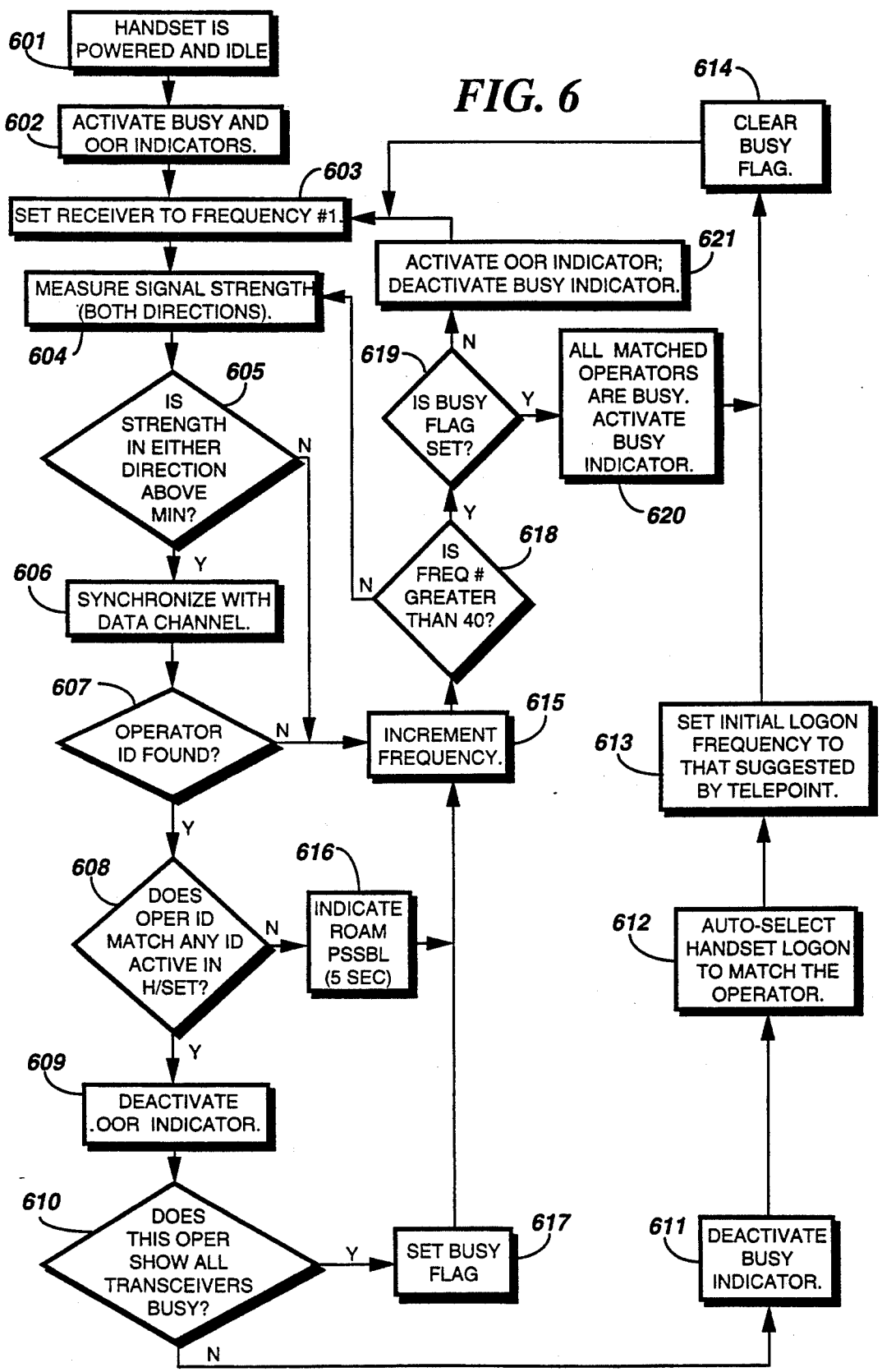
FIG. 6 is a flow diagram showing a method for determining the acquisition status of a base station by a radio telephone in accordance with the present invention.

Referring to FIG. 5D, 5E, and 5F, a radio telephone receiver begins a scan of all possible CT-2 channels to determine their usage status. The first step is to measure the signal strength on each of the 40 possible CT-2 channels. Because the radio telephone is unsynchronized with the base station, a minimum of four signal strength measurements (507, 508, 509, 510) are preferably made at 500 microsecond intervals in order to determine whether the radio telephone is receiving both, one, or none of the possible TDD transmissions on each channel. For each of the preferably 40 channels, the largest of the four signal strength measurements should be retained along with one other measurement offset from it by one millisecond in either direction, while the remaining two measurements should be discarded.

In a preferred embodiment of the invention, the radio telephone continuously scans all channels to determine a base station status.

This embodiment uses the technique shown in FIGS. 5D, 5E, and 5F, and does not require a connection attempt to the base station. In order for the radio telephone to uniquely identify each of the single-direction signals, the base station must periodically transmit a base station message comprising: a sync character (e.g., null character or alternately any character that can be transmitted by the base station and not recognized as a control character by the radio telephone), and status messages comprising: an operator identifier, an all-transceivers-busy status (as applicable), and a suggested logon frequency on the data channel of all active radio telephones. If all transceivers are inactive, the base station must continuously transmit the aforementioned information on at least one transceiver (along with dummy voice) so that a radio telephone logging into the system will always be able to obtain the information.

Whenever a scan of all channels finds one or more channels having useable signal levels, the radio telephone must synchronize itself with the data channel on each of the useable channels and begin searching for the presence of the periodically transmitted radio telephone synchronization character and status messages. If messages are found on the channel, then the signal must be from a base station, and the status messages will indicate the operator identification, the busy status, and the suggested logon frequency. If the messages are not found on the channel, then the signal must be from another radio telephone, and the search must proceed to the next channel, and continue until all channels with useable signals have been searched without finding any messages, at which time an indication is provided representing a channel out-of-range status meaning that all base stations are out-of-range. Accordingly, in this case, the user should be notified of a channel out-of-range status.

Referring to FIG. 7, when the handset (radio telephone) is powered on and idle (e.g. no communications are taking place) (601), the BUSY and out-of-range (OOR) indicators are activated (602). Step 603 sets (tunes) the radio telephone's receiver to frequency number one. Step 604 measures a power spectrum associated with the channel by sampling the power spectrum associated with the channel at a predetermined time interval. This measurement provides a signal strength indication for each available transmission slot (time interval) on the particular TDD channel. In step 605, if the signal strength in either direction determined to be above a predetermined magnitude, step 606 synchronizes with a received signal to determine if communication exists on the channel. After step 606 synchronizes with the channel's data, step 607 attempts to recover an operator identifier for the base station. If an operator identifier is recovered in step 607, step 608 correlates the handset's operator identifier to the received operator identifier. If the correlation is successful, step 609 deactivates the out-of-range indicator then step 610 tests the channel's status message for an all-transceivers-busy status. If this message is not detected in step 610, step 611 deactivates the busy indicator, step 612 recovers a logon channel frequency and step 613 selects the logon channel frequency as the available channel. Step 614 then clears the busy flag and returns control to step 603.

Returning to step 605, if both signal strength measurements are below the predetermined magnitude, step 615 increments the frequency. Step 615 is also executed when no operator identification is found (step 607), a roam possible indication (step 616) has been executed by step 608 failing, or an all-transceivers-busy status (step 610) has set the busy flag (step 617). After the frequency is incremented, step 618 tests for the frequency number being greater than the highest allotted channel in the system. In the present CAI specification there are a maximum of forty full duplex channels allowed. Obviously, with the extension and expansion of this system in the future, more channels may be added and can be easily accommodated within the scope of the embodiment disclosed in this invention. If step 618 fails, control is passed to step 604. If step 618 is true, step 619 tests for the busy flag being set. If step 619 is true, all operators registered to the radio telephone are busy and the busy indicator is activated (step 620). Step 614 then clears the busy flag and returns control to step 603. In the case where step 619 is false, step 621 activates the out-of-range indicator and deactivates the busy indicator. Control is then passed to step 603 and the channel acquisition status is continuously updated.

We claim:

1. In a radio telephone communication system having:
 a base station with at least one frequency agile transceiver capable of time division duplex operation on at least one radio frequency channel for facilitating communication with at least one radio telephone on the at least one radio frequency channel, a method of determining acquisition status of the at least one frequency agile transceiver in the base station comprising the steps of:
 at a radio telephone:
 scanning a plurality of channels capable of being generated by the at least one frequency agile transceiver to find an available channel, the plurality of channels including the at least one radio frequency channel; and
 providing an indication representing a base station busy status when all of the at least one frequency agile transceivers are in use indicating no available channels as determined when one of:
 bidirectional time division duplex communication including a base station identification signal is being communicated by the at least one frequency agile transceiver on the at least one radio frequency channel; and
 unidirectional time division duplex communication including a base station identification signal is being communicated by the at least one frequency agile transceiver on the at least one radio frequency channel.

2. The method according to claim 1 wherein the scanning step comprises the steps of:
  tuning the radio telephone to the at least one channel; and
  measuring a power spectrum associated with the at least one channel to provide a signal strength indication.

3. The method according to claim 2 wherein the measuring step further comprises the steps of:
  sampling the power spectrum associated with the at least one channel at a predetermined time interval; and
  synchronizing with at least one received signal to determine if any time division duplex communication exists on the at least one channel.

4. The method according to claim 3 further comprising the steps of:
  recovering an operator identifier from a signal validly transmitted only by the base station; and
  providing an indication representing a roam available status in response to the operator identifier differing from an operator identifier registered with the radio telephone.

5. The method according to claim 3 further comprising the steps of:
  determining if the signal strength indication is below a predetermined magnitude; and
  providing an indication representing a base station out-of-range status in response to the signal strength indication being below the predetermined magnitude.

6. The method according to claim 3 further comprising the step of:
  providing an indication representing a base station out-of-range status when unidirectional time division duplex communication exists on a channel and the unidirectional time division duplex communication lacks the base station identification signal.

7. The method according to claim 1 further comprising the steps of:
  recovering a suggested logon channel frequency for the base station from a base station status signal; and
  selecting the suggested logon channel frequency as the available channel.

8. The method according to claim 1 further comprising the step of:
  broadcasting to the radiotelephone in a base station status signal a suggested logon channel frequency for the base station.

9. In a radio telephone communication system having:
  a base station with at least one frequency agile transceiver capable of time division duplex operation on at least one radio frequency channel for facilitating communication with at least one radio telephone on the at least one radio frequency channel, a method of determining acquisition status of the at least one frequency agile transceiver in the base station comprising the steps of:
  at a radio telephone:
  providing an indication representing a base station busy status when time division duplex communication exists on the radio frequency channel and the time division duplex communication includes at least a signal validly transmitted only by the base station.

10. A radio telephone communication system, comprising:
  a base station with at least one frequency agile transceiver capable of time division duplex operation on at least one radio frequency channel for facilitating communication with at least one radio telephone on the at least one radio frequency channel; and
  a radio telephone capable of determining an acquisition status of the at least one frequency agile transceiver in the base station, the radio telephone comprising:
  means for scanning a plurality of channels capable of being generated by the at least one frequency agile transceiver to find an available channel, the plurality of channels including the at least one radio frequency channel; and
  means for providing an indication representing a base station busy status when all of the at least one frequency agile transceivers are in use as determined by the means for scanning the plurality of channels, the determination indicating no available channels when one of:
  bidirectional time division duplex communication including a base station identification signal is being communicated by the at least one frequency agile transceiver on the at least one radio frequency channel; and
  unidirectional time division duplex communication including a base station identification signal is being communicated by the at least one frequency agile transceiver on the at least one radio frequency channel.

11. The radio telephone communication system according to claim 10 wherein the means for scanning comprises:
  means for tuning the radio telephone to the at least one radio frequency channel;
  means for sampling a power spectrum associated with the at least one radio frequency channel determined by the means for tuning at a predetermined time interval to provide a signal strength indication;
  means for synchronizing with at least one received signal when the signal strength as indicated by the means for tuning is above the predetermined magnitude for determining if time division duplex communication exists on the channel, resulting in the indication representing the base station busy status.

12. The radio telephone communication system according to claim 11 further comprising:
  means for recovering an operator identifier from the base station; and
  means for providing an indication representing a roam available status in response to the operator identifier differing from an operator identifier registered with the radio telephone.

13. The radio telephone communication system according to claim 11 further comprising:
  means for determining if the signal strength indication is below a predetermined magnitude; and
  means for providing an indication representing a base station out-of-range status in response to the signal strength indication being below the predetermined magnitude.

14. The radio telephone communication system according to claim 11 further comprising:
  means for providing an indication representing a base station out-of-range status when unidirectional time division duplex communication exists on a channel and the unidirectional time division duplex communication lacks at least a signal validly transmitted only by the base station.

15. The radio telephone communication system according to claim 11 further comprising:
    means for recovering a suggested logon channel frequency for the base station from a base station status signal; and
    means for selecting the suggested logon channel frequency as the available channel.

16. The radio telephone communication system according to claim 15 wherein the base station status signal comprises: a suggested logon channel frequency for the base station.

17. A radio telephone communication system having:
    a base station with at least one radio frequency channel and being capable of communicating with at least one radio telephone capable of operating over at least one radio frequency channel comprising:
    at a radio telephone:
    means for providing an indication representing a base station busy status when time division duplex communication exists on the radio frequency channel and the time division duplex communication includes at least a signal validly transmitted only by the base station.

* * * * *